US012756297B2

(12) United States Patent
Kansaku

(10) Patent No.: US 12,756,297 B2
(45) Date of Patent: Oct. 6, 2026

(54) POWER SUPPLY CONTROL CIRCUIT AND POWER SUPPLY DEVICE INCLUDING SAME

(71) Applicant: Rohm Co., Ltd., Kyoto (JP)

(72) Inventor: Kiyoshi Kansaku, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 173 days.

(21) Appl. No.: 18/661,102

(22) Filed: May 10, 2024

(65) Prior Publication Data

US 2024/0380306 A1 Nov. 14, 2024

(30) Foreign Application Priority Data

May 12, 2023 (JP) ................................ 2023-079404

(51) Int. Cl.
*H02M 1/36* (2007.01)
*H02M 1/00* (2007.01)
*H02M 1/32* (2007.01)
*H02M 3/158* (2006.01)

(52) U.S. Cl.
CPC ............... *H02M 1/36* (2013.01); *H02M 1/32* (2013.01); *H02M 3/158* (2013.01); *H02M 1/0025* (2021.05)

(58) Field of Classification Search
CPC ............ H02M 1/25; H02M 1/32; H02M 1/36; H02M 3/158
See application file for complete search history.

(56) References Cited

U.S. PATENT DOCUMENTS 8,653,800 B2 2/2014 Wachi et al.
2016/0329807 A1* 11/2016 Daly ...................... H02M 1/32
2016/0380541 A1 12/2016 Moon et al.
2024/0380312 A1 11/2024 Kansaku

FOREIGN PATENT DOCUMENTS

JP 2018-133915 8/2018

OTHER PUBLICATIONS

U.S. Appl. No. 18/660,535, filed May 10, 2024, Kansaku.

* cited by examiner

*Primary Examiner* — Jue Zhang
(74) *Attorney, Agent, or Firm* — Fish & Richardson P.C.

(57) ABSTRACT

A power supply control circuit includes: a soft start generation circuit that outputs a soft start voltage which gradually increases with time; an error signal generation circuit that generates an error signal corresponding to a difference between a feedback voltage corresponding to an output voltage in a switch output stage and the soft start voltage; an output control circuit that controls the switch output stage according to the error signal; and a soft start control circuit that controls the soft start voltage according to the feedback voltage.

6 Claims, 7 Drawing Sheets

POWER SUPPLY CONTROL CIRCUIT AND POWER SUPPLY DEVICE INCLUDING SAME

CROSS-REFERENCE TO RELATED APPLICATIONS

This nonprovisional application claims priority under 35 U.S.C. § 119(a) on Patent Application No. 2023-079404 filed in Japan on May 12, 2023, the entire contents of which are hereby incorporated by reference.

BACKGROUND OF THE DISCLOSURE

Field of the Invention

The present disclosure relates to a power supply control circuit and a power supply device which includes such a power supply control circuit.

Description of the Related Art

Conventionally, as a power supply device which generates an output voltage from an input voltage, there is a power supply device which includes a power supply control circuit that has a soft start function. The power supply control circuit as described above controls, when the power supply device is started up, the output voltage such that the output voltage gradually rises with time. Hence, the power supply device described above uses the soft start function to be able to suppress an inrush current at startup.

SUMMARY OF THE DISCLOSURE

A power supply control circuit according to an aspect disclosed in the present specification includes a soft start generation circuit, an error signal generation circuit, an output control circuit and a soft start control circuit. The soft start generation circuit outputs a soft start voltage which gradually increases with time. The error signal generation circuit generates an error signal corresponding to a difference between a feedback voltage corresponding to an output voltage in a switch output stage and the soft start voltage. The output control circuit controls the switch output stage according to the error signal. The soft start control circuit controls the soft start voltage according to the feedback voltage.

A power supply control circuit according to another aspect disclosed in the present specification includes a soft start generation circuit, an error signal generation circuit and an output control circuit. The soft start generation circuit outputs a soft start voltage which gradually increases with time. The error signal generation circuit generates an error signal corresponding to a difference between a feedback voltage corresponding to an output voltage in a switch output stage and the soft start voltage. The output control circuit controls the switch output stage according to the error signal. The soft start generation circuit can temporarily stop an increase in the soft start voltage.

A power supply device disclosed in the present specification includes the power supply control circuit and the switch output stage in the aspect or the other aspect described above, and generates the output voltage from an input voltage.

In the power supply control circuit according to the aspect disclosed in the present specification, the soft start voltage is controlled according to the feedback voltage. Hence, the soft start function can be more preferable.

In the power supply control circuit according to the other aspect disclosed in the present specification, the soft start generation circuit can temporarily stop an increase in the soft start voltage. Hence, the soft start function can be more preferable.

In the power supply device disclosed in the present specification, it is possible to provide a power supply device which includes the power supply control circuit that can perform more preferable feedback control.

DESCRIPTION OF THE PREFERRED EMBODIMENTS

<Power Supply Device Y in Comparative Example>

Figure 1:
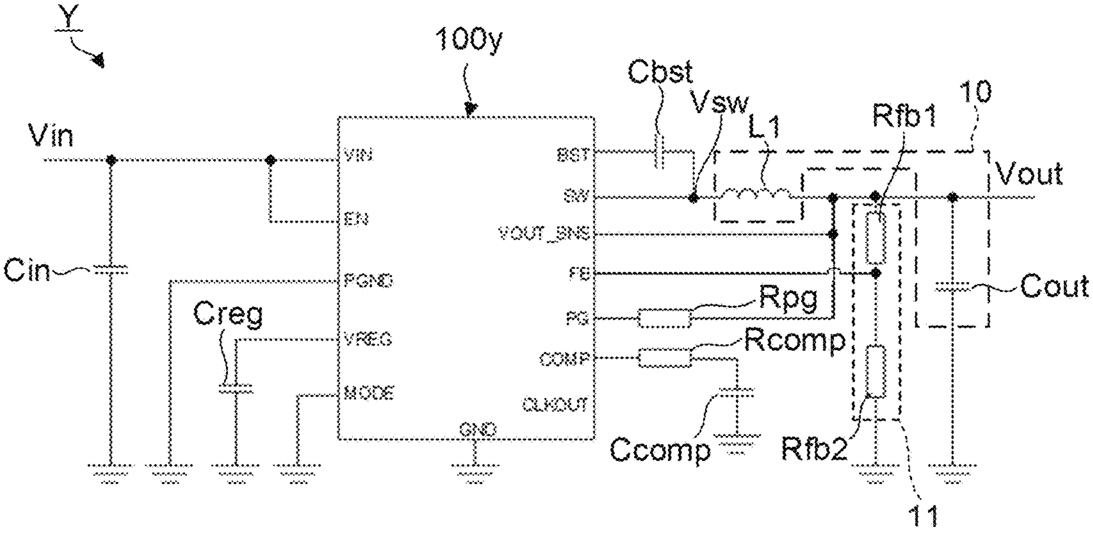
FIG. 1 is a block diagram showing the configuration of a power supply device in Comparative Example.
Figure 2:
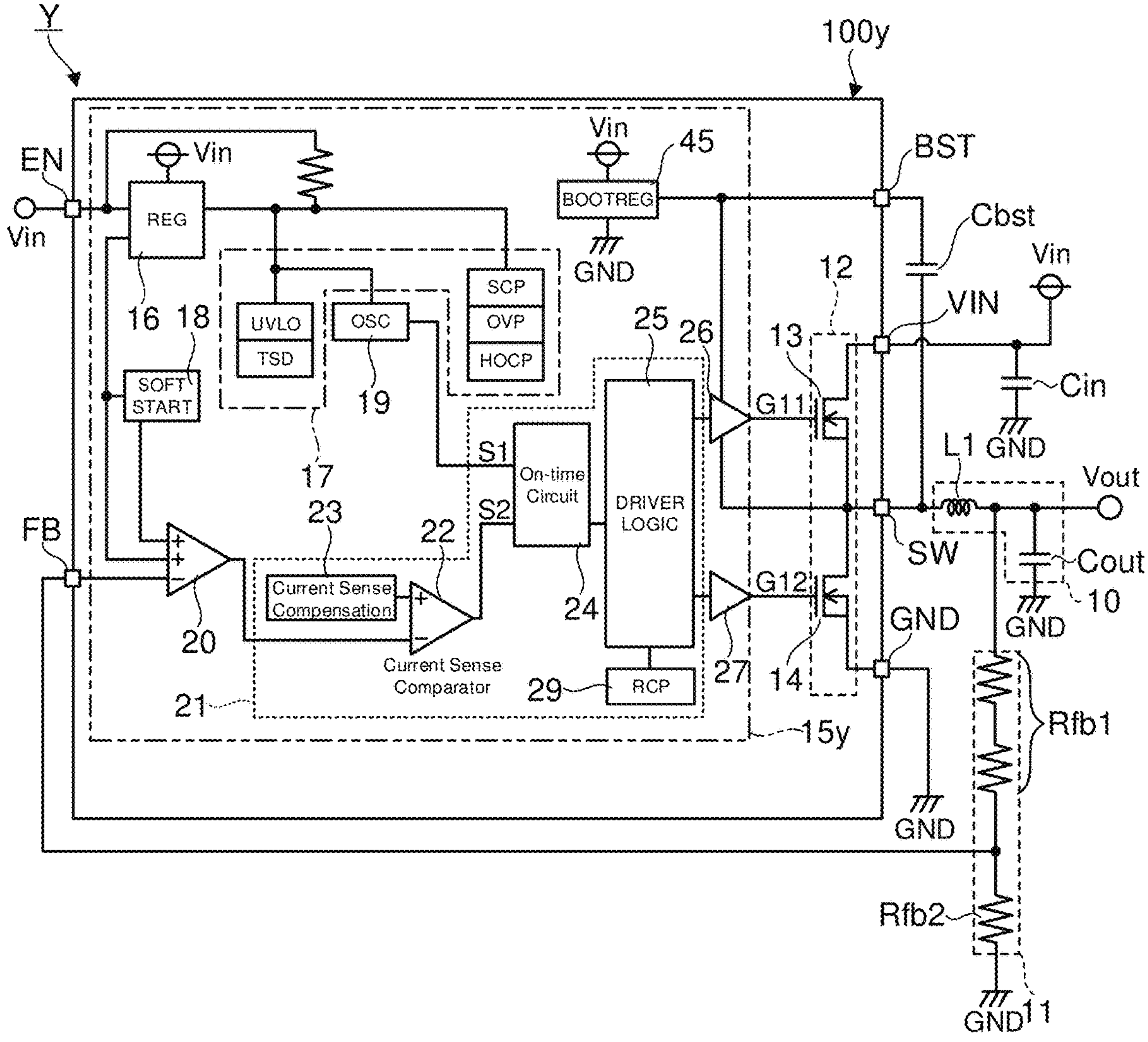
FIG. 2 is a block diagram showing the internal configuration of a semiconductor device in the power supply device in Comparative Example.

A power supply device Y will first be described as Comparative Example (=configuration contrasted with an embodiment in the present disclosure which will be described later) for a power supply device X in the present disclosure with reference to FIGS. 1 to 3. FIG. 1 is a block diagram showing the configuration of the power supply device Y in Comparative Example. FIG. 2 is a block diagram showing the internal configuration of a semiconductor device 100*y*.

The power supply device Y is a switching regulator which generates a desired output voltage Vout from an input voltage Vin. The power supply device Y includes the semiconductor device 100*y*, a rectifier smoothing circuit 10, a voltage divider circuit 11 and various discrete components (such as capacitors Creg and Ccomp and resistors Rpg and Rcomp).

The semiconductor device 100*y* is a monolithic semiconductor integrated circuit device (so-called power supply control IC) which comprehensively controls the power supply device Y. The semiconductor device 100*y* includes, as means for establishing electrical connection with the outside of the device, a plurality of external terminals (described with reference to the figure, for example, a feedback terminal FB, an enable terminal EN, a boot terminal BST, an input terminal VIN, a switch terminal SW and a ground terminal GND). The details of the semiconductor device 100*y* will be described later.

The rectifier smoothing circuit 10 includes a coil L1 and an output capacitor Cout. The first end of the coil L1 is connected to the switch terminal SW. The second end of the coil L1 is connected to the output end of the output voltage Vout together with the first end of the output capacitor Cout. The second end of the output capacitor Cout is connected to a ground end. The rectifier smoothing circuit 10 rectifies and smoothes a switch voltage Vsw of a rectangular waveform (the node voltage of the switch terminal SW) to generate the output voltage Vout.

The voltage divider circuit 11 includes resistors Rfb1 and Rfb2. The resistor Rfb1 includes a plurality of (here, two) resistors. The first end of the resistor Rfb1 is connected to the second end of the coil L1 together with the first end of the output capacitor Cout. The second end of the resistor Rfb1 is connected to the feedback terminal FB together with the first end of the resistor Rfb2. The second end of the resistor Rfb2 is connected to the ground end. The voltage divider circuit 11 divides the output voltage Vout to generate a feedback voltage Vfb, and inputs the feedback voltage Vfb to the feedback terminal FB.

The first end of a boot capacitor Cbst is connected to the boot terminal BST. The second end of the boot capacitor Cbst is connected to the switch terminal SW together with the first end of the coil L1. The boot capacitor Cbst may be integrated into the semiconductor device 100*y*, and in this case, the boot terminal BST can be omitted.

The first end of an input capacitor Cin is connected to the input terminal VIN together with the input end of the input voltage Vin. The second end of the input capacitor Cin is connected to the ground end.

The semiconductor device 100*y* will be described in detail. The semiconductor device 100*y* includes a switch output stage 12 and a power supply control circuit 15*y*. Although here, an example where the switch output stage 12 is integrated into the semiconductor device 100*y* will be described, the switch output stage 12 may be externally attached to the semiconductor device 100*y*.

The switch output stage 12 includes an output transistor 13 and a synchronous rectifier transistor 14. The output transistor 13 and the synchronous rectifier transistor 14 are NMOSFETs (N-channel type metal oxide semiconductor field effect transistors). The switch output stage 12 complementarily turns on and off each of the output transistor 13 and the synchronous rectifier transistor 14 to generate the switch voltage Vsw of a rectangular waveform (the node voltage of the switch terminal SW) which is pulse driven between the input voltage Vin and a ground voltage (ground level voltage).

The meaning of "complementarily" in the present specification includes not only a case where the on/off states of the output transistor 13 and the synchronous rectifier transistor 14 are completely reversed but also a case where a delay is given to the on/off transition timing of the output transistor 13 and the synchronous rectifier transistor 14 (=case where a simultaneous off period is provided).

The drain of the output transistor 13 is connected to the input end of the input voltage Vin. The source of the output transistor 13 and the drain of the synchronous rectifier transistor 14 each are connected to the switch terminal SW. The source of the synchronous rectifier transistor 14 is connected to the ground terminal GND (=the application end of the ground voltage).

A gate signal G11 is input to the gate of the output transistor 13. The output transistor 13 is turned on when the gate signal G11 is high whereas the output transistor 13 is turned off when the gate signal G11 is low.

On the other hand, a gate signal G12 is input to the gate of the synchronous rectifier transistor 14. The synchronous rectifier transistor 14 is turned on when the gate signal G12 is high whereas the synchronous rectifier transistor 14 is turned off when the gate signal G12 is low.

The power supply control circuit 15*y* includes a constant voltage circuit 16, a protection circuit 17, an oscillator 19, a soft start generation circuit 18, an error signal generation circuit 20, an output control circuit 21 and a boot power supply 45.

The constant voltage circuit 16 is subjected to enable control according to the terminal voltage of the enable terminal EN. For example, when the constant voltage circuit 16 is brought into an enable state (=operation permission state), the application end of the input voltage Vin may be connected to the enable terminal EN. The constant voltage circuit 16 which has been brought into the enable state generates a reference voltage Vref based on the input voltage Vin.

The protection circuit 17 is operated by receiving the supply of power from the constant voltage circuit 16. The protection circuit 17 includes an overheat protection circuit TSD, a low voltage malfunction prevention circuit UVLO, a short circuit protection circuit SCP, an overvoltage protection circuit OVP, an overcurrent protection circuit HOCP and a reverse current prevention circuit RCP, and generates a signal corresponding to each of the circuits. For example, the overcurrent protection circuit HOCP can detect whether an output current IL is a predetermined overcurrent protection value, and the protection circuit 17 generates a signal corresponding to the result of the detection performed by the overcurrent protection circuit HOCP.

The oscillator 19 is operated by receiving the supply of the reference voltage Vref, and generates a reference clock signal S1 which oscillates at a predetermined frequency.

The soft start generation circuit 18 is operated by receiving the supply of power from the constant voltage circuit 16. The soft start generation circuit 18 generates a soft start voltage Vss which gradually increases with time. The soft start generation circuit 18 increases the soft start voltage Vss from a zero value (=GND) at a constant rate of increase over a predetermined soft start time.

The error signal generation circuit 20 includes two non-inverting input terminals (+), one inverting input terminal (−) and an output end. One of the non-inverting input terminals (+) of the error signal generation circuit 20 is connected to the soft start generation circuit 18. The other non-inverting input terminal (+) of the error signal generation circuit 20 is connected to the soft start generation circuit 18 and the constant voltage circuit 16. The inverting input terminal (−) of the error signal generation circuit 20 is connected to the feedback terminal FB.

The error signal generation circuit 20 generates an error signal V1 corresponding to a difference between the lower one of the reference voltage Vref and the soft start voltage Vss and the feedback voltage Vfb.

The output control circuit 21 is connected to the error signal generation circuit 20 and the oscillator 19. The output control circuit 21 controls the switch output stage 12 (more specifically, the on-duty cycle of the switch output stage 12) according to the error signal V1 and the reference clock signal S1. A more detailed description will be given as follows.

The output control circuit 21 includes a current sense comparator 22, a current sense compensation circuit 23, an on-time circuit 24, a driver control circuit 25, a high-side driver 26 and a low-side driver 27.

The current sense compensation circuit 23 generates, for example, a compensation voltage of a ramp waveform corresponding to the output current IL flowing through the coil L1. The output end of the current sense compensation circuit 23 is connected to the non-inverting input terminal (+) of the current sense comparator 22.

The inverting input terminal (−) of the current sense comparator 22 is connected to the output end of the error signal generation circuit 20. The current sense comparator 22 compares the error signal V1 and the compensation voltage to generate a comparison signal S2. For example, when the error signal V1 is higher than the compensation voltage, the comparison signal S2 is low. When the error signal V1 is lower than the compensation voltage, the comparison signal S2 is high.

The on-time circuit 24 is connected to the oscillator 19, the current sense comparator 22 and the driver control circuit 25. The on-time circuit 24 generates an on-time signal corresponding to the reference clock signal S1 and the comparison signal S2, and inputs the on-time signal to the driver control circuit 25.

The driver control circuit 25 is connected to the high-side driver 26, the low-side driver 27 and a RCP (reverse current protection) circuit 29.

The driver control circuit 25 drives and controls, based on the on-time signal, the high-side driver 26 and the low-side driver 27. More specifically, the driver control circuit 25 generates, based on the on-time signal, a high-side driver drive signal and a low-side driver drive signal, and inputs them to the high-side driver 26 and the low-side driver 27.

The high-side driver 26 is connected to the driver control circuit 25, the boot terminal BST, the switch terminal SW and the output transistor 13. The low-side driver 27 is connected to the synchronous rectifier transistor 14 and the driver control circuit 25.

The high-side driver 26 generates the gate signal G11 corresponding to the high-side driver drive signal, and inputs it to the gate of the output transistor 13. When the high-side driver drive signal is high, the high-side driver 26 outputs the high-level (=the voltage of the boot terminal BST) gate signal G11. When the high-side driver drive signal is low, the high-side driver 26 outputs the low-level (=the voltage of the switch terminal SW) gate signal G11.

The low-side driver 27 generates the gate signal G12 corresponding to the low-side driver drive signal, and inputs it to the gate of the synchronous rectifier transistor 14.

The driver control circuit 25 controls the output current IL according to the result of the detection performed by the overcurrent protection circuit HOCP. Specifically, when the overcurrent protection circuit HOCP detects that the output current IL reaches the overcurrent protection value, the driver control circuit 25 controls the drive of the switch output stage 12 so as to restrict the output current IL. Specifically, when the output current IL is brought into an overcurrent state, the driver control circuit 25 drives and controls the switch output stage 12 such that the switch output stage 12 performs hiccup drive (=intermittent drive in which the on state and off state are periodically switched) so as to repeat the forcible stop and the self-return of the output current IL.

The boot power supply 45 is connected to the application end of the input voltage Vin and the boot terminal BST. The boot power supply 45 charges the boot capacitor Cbst with the input voltage Vin. When the boot capacitor Cbst is charged, the voltage of the boot terminal BST is higher than the input voltage Vin, and thus it is possible to secure the drive of the high-side driver 26.

Figure 3:
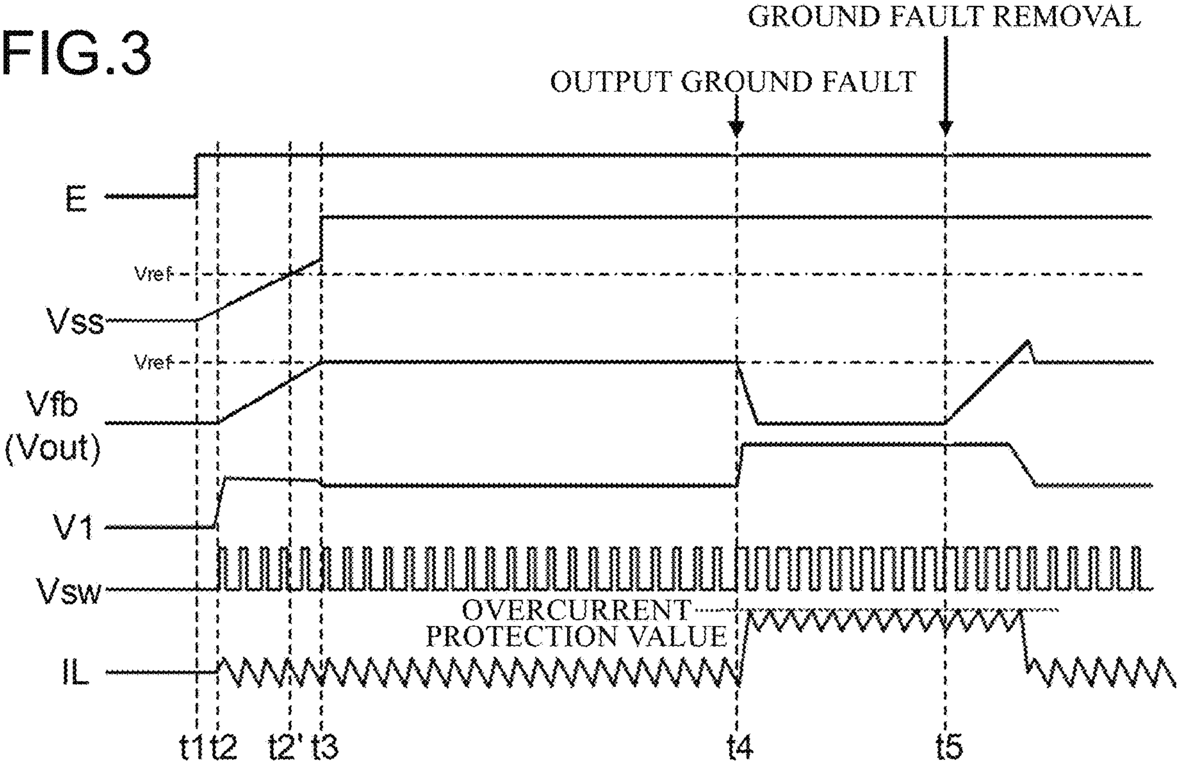
FIG. 3 is a timing chart showing signals and an output current in the power supply device in Comparative Example.

FIG. 3 is a timing chart showing signals and the output current IL in the power supply device Y in Comparative Example. In FIG. 3, an enable signal E, the soft start voltage Vss, the feedback voltage Vfb, the error signal V1, the switch voltage Vsw and the output current IL are shown sequentially from above.

When power is turned on at predetermined timing t1, the enable signal E rises high. Then, the soft start voltage Vss gradually increases at the constant rate of increase from the timing t1 to timing t3. Changes in values from the timing t1 to the timing t3 will be sequentially described.

When timing t2' arrives, the magnitude of the soft start voltage Vss matches the reference voltage Vref. When the timing t3 arrives, the soft start voltage Vss rises high. After the timing t3, the soft start voltage Vss is fixed to a high level.

The feedback voltage Vfb is subjected to feedback control such that the feedback voltage Vfb gradually increases at a constant rate of increase from timing t2 to the timing t3 with the lower one of the reference voltage Vref and the soft start voltage Vss used as a target value. A more detailed description will be given as follows. When the soft start voltage Vss is lower than the reference voltage Vref (between the timing t2 and the timing t2'), the feedback voltage Vfb is subjected to feedback control with the soft start voltage Vss used as the target value. When the soft start voltage Vss is equal to or greater than the reference voltage Vref (from the timing t2' to the timing t3), the feedback voltage Vfb is subjected to feedback control with the reference voltage Vref used as the target value.

The error signal V1 starts to increase at predetermined timing immediately before the timing t2 arrives, and gradually decreases immediately after the timing t2 to the timing t3.

When the timing t3 arrives, the feedback voltage Vfb matches the reference voltage Vref. At the timing t3, the soft start voltage Vss is fixed to a high level.

By the soft start operation as described above, the output voltage Vout can be gradually raised at startup (=between the timing t1 and the timing t3). In this way, it is possible to suppress an inrush current at startup.

<Considerations for Ground Fault Return>

Incidentally, in the power supply device having the soft start function such as the power supply device Y described above, when after the output end of the switch output stage 12 has a ground fault, a ground fault state is removed, an inrush current may be generated. A more detailed description will be given as follows.

As described above, the soft start voltage Vss gradually increases at the constant rate of increase from the timing t1 to the timing t3, and when the timing t2' arrives, the soft start voltage Vss matches the reference voltage Vref. Then, after the timing t3, the soft start voltage Vss is fixed to a state where the soft start voltage Vss has risen high (voltage level higher than the reference voltage Vref). Here, if the output end of the switch output stage 12 is brought into the ground fault state (state where the output end is connected to the ground end) at predetermined timing t4 after the timing t3, the output voltage Vout (=the feedback voltage Vfb) decreases to the zero value (=ground level). As the feedback voltage Vfb decreases, the difference between the feedback voltage Vfb and the reference voltage Vref gradually increases. Then, the error signal V1 increases.

Here (=after the timing t4), as shown in FIG. 3, the soft start voltage Vss is kept at the value (=high level) higher than the reference voltage Vref. As described above, the feedback voltage Vfb is subjected to feedback control with the lower one of the soft start voltage Vss and the reference voltage Vref used as the target value. Hence, when the ground fault state is removed at predetermined timing t5, the feedback voltage Vfb is subjected to feedback control with the reference voltage Vref used as the target value.

A difference between the feedback voltage Vfb which has decreased to the zero value and the reference voltage Vref is relatively large. Hence, after the timing t5, an overshoot may occur in which the output voltage Vout (=the feedback voltage Vfb) rapidly rises enough to exceed the reference voltage Vref or an inrush current may flow through a load connected to the power supply device Y.

<Power Supply Device X in Present Disclosure>

The power supply device X in the present disclosure will then be described. Differences of the power supply device X from the power supply device Y in Comparative Example will be described below, and the same configurations as in the power supply device Y are identified with the same symbols, and thus description thereof is omitted.

Figure 4:
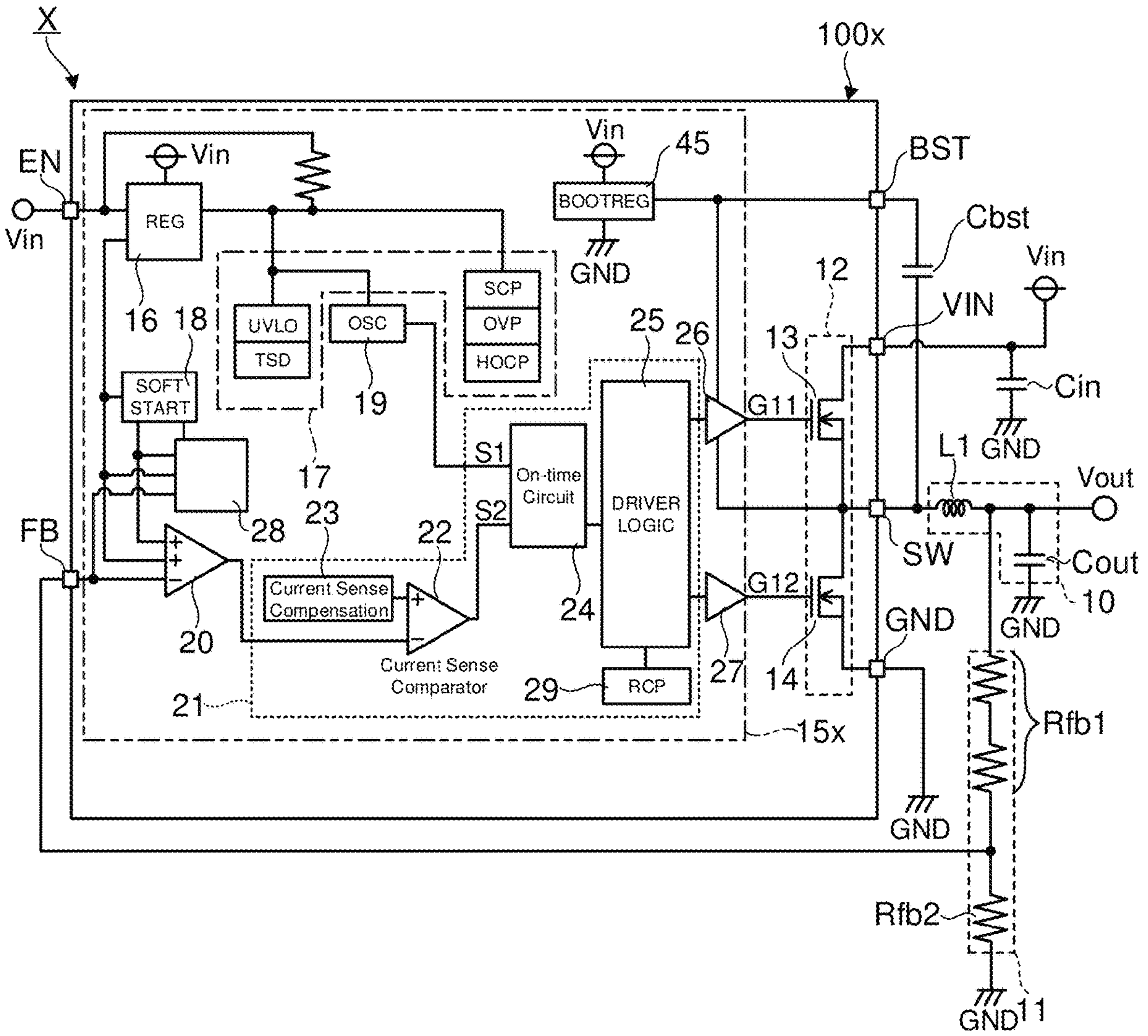
FIG. 4 is a block diagram showing the internal configuration of a semiconductor device in the present disclosure.

FIG. 4 is a block diagram showing the internal configuration of a semiconductor device 100*x*. The power supply device X is a switching regulator which generates a desired output voltage Vout from an input voltage Vin. As shown in FIG. 4, the power supply device X includes the semiconductor device 100*x*, a rectifier smoothing circuit 10, a voltage divider circuit 11 and various discrete components (such as capacitors Creg and Ccomp and resistors Rpg and Rcomp).

The semiconductor device 100*x* is a monolithic semiconductor integrated circuit device (so-called power supply control IC) which comprehensively controls the power supply device X. The semiconductor device 100*x* includes, as means for establishing electrical connection with the outside of the device, a plurality of external terminals (described with reference to the figure, for example, a feedback terminal FB, an enable terminal EN, a boot terminal BST, an input terminal VIN, a switch terminal SW and a ground terminal GND).

A power supply control circuit 15*x* includes a constant voltage circuit 16, a protection circuit 17, an oscillator 19, a soft start generation circuit 18, an error signal generation circuit 20, an output control circuit 21, a boot power supply 45 and a soft start control circuit 28.

The soft start control circuit 28 controls the soft start voltage Vss according to a feedback voltage Vfb. The soft start generation circuit 18 and the soft start control circuit 28 will be described in detail.

The soft start control circuit 28 is connected to the constant voltage circuit 16, the soft start generation circuit 18, one of the non-inverting input terminals (+) of the error signal generation circuit 20, the other non-inverting input terminal (+) of the error signal generation circuit 20 and the inverting input terminal (−) of the error signal generation circuit 20.

Figure 5:
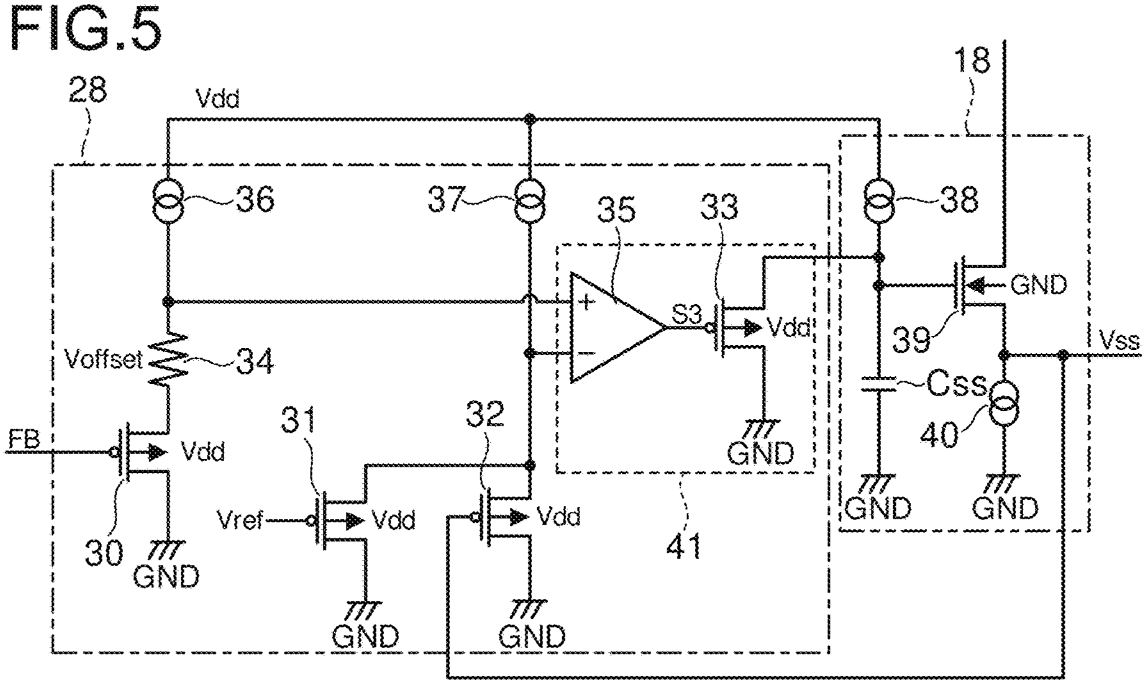
FIG. 5 is a block diagram showing the configuration of a soft start control circuit.

FIG. 5 is a block diagram showing the configuration of the soft start control circuit 28. As shown in FIGS. 4 and 5, the soft start control circuit 28 includes a charge/discharge control circuit 41, first to third transistors 30 to 32, a first current source 36, a second current source 37 and a resistor 34. The charge/discharge control circuit 41 includes an amplifier 35 and a fourth transistor 32. The details of the charge/discharge control circuit 41 will be described later.

The first to fourth transistors 30 to 33 are PMOSFETs (P-channel type metal oxide semiconductor field effect transistors). The first transistor 30 functions as a first input element which receives the feedback voltage Vfb. Specifically, the gate of the first transistor 30 is connected to the feedback terminal FB. In other words, the feedback voltage Vfb is input to the gate of the first transistor 30. The source of the first transistor 30 is connected to the first end of the resistor 34. The drain of the first transistor 30 is connected to a ground end.

The second end of the resistor 34 is connected to the first current source 36. When the first transistor 30 is on, a current flows from the first current source 36 through the resistor 34 to the ground end. An offset voltage Voffset is generated between both ends of the resistor 34.

The second transistor 31 functions as a second input element which receives the reference voltage Vref. The reference voltage Vref is input to the gate of the second transistor 31 from the constant voltage circuit 16. The source of the second transistor 31 is connected to the charge/discharge control circuit 41. More specifically, the source of the second transistor 31 is connected to the inverting input terminal (−) of the amplifier 35 together with the source of the third transistor 32. The drain of the second transistor 31 is connected to the ground end.

The third transistor 32 functions as a third input element which receives the soft start voltage Vss. The soft start voltage Vss is input to the gate of the third transistor 32. The drain of the third transistor 32 is connected to the ground end.

The amplifier 35 generates a switch signal S3 according to a difference between a voltage input to the non-inverting input terminal (+) and a voltage input to the inverting input terminal (−). The non-inverting input terminal (+) of the amplifier 35 is connected to the resistor 34 and the first current source 36. A voltage obtained by adding the feedback voltage Vfb, the gate-source voltage of the first transistor 30 and the offset voltage Voffset is input to the non-inverting input terminal (+) of the amplifier 35. The lower one of a voltage obtained by adding the reference voltage Vref and the gate-source voltage of the second transistor 31 and a voltage obtained by adding the soft start voltage Vss and the gate-source voltage of the third transistor 32 is input to the inverting input terminal (−) of the amplifier 35.

The fourth transistor 33 is turned on and off by receiving the switch signal S3. Specifically, the gate of the fourth transistor 33 is connected to the output end of the amplifier 35. In other words, the switch signal S3 is input to the gate of the fourth transistor 33. The source of the fourth transistor 33 is connected to the soft start generation circuit 18. The drain of the fourth transistor 33 is connected to the ground end.

The soft start generation circuit 18 includes a third current source 38, a soft start capacitor Css, a fifth transistor 39 and a fourth current source 40.

The first end of the soft start capacitor Css is connected to the third current source 38. The second end of the soft start capacitor Css is connected to the ground end. The third current source 38 outputs a predetermined constant current to charge the soft start capacitor Css.

The fifth transistor 39 is a NMOSFET (N-channel type metal oxide semiconductor field effect transistor). The fifth transistor 39 outputs, from its source, the soft start voltage Vss corresponding to the amount of charge (=charge amount) of the soft start capacitor Css. Specifically, the gate of the fifth transistor 39 is connected to the third current source 38 and the first end of the soft start capacitor Css. The source of the fifth transistor 39 is connected to a fourth current source 40 and the output end of the soft start generation circuit 18.

The charge/discharge control circuit 41 controls the charge and discharge of the soft start capacitor Css. Specifically, the charge/discharge control circuit 41 charges and discharges the soft start capacitor Css according to a difference between the lower one of the reference voltage Vref and the soft start voltage Vss and a voltage obtained by adding the feedback voltage Vfb and the offset voltage Voffset. A more detailed description will be given as follows.

In a state where the soft start voltage Vss is lower than the reference voltage Vref, the amplifier 35 generates the switch signal S3 corresponding to a difference between a voltage input to the non-inverting input terminal (+) (=voltage obtained by adding the feedback voltage Vfb and the offset voltage Voffset) and a voltage input to the inverting input terminal (−) (=soft start voltage Vss). A differential current obtained by subtracting a current flowing through the fourth transistor 33 from a current which is output from the third current source 38 according to the switch signal S3 flows through the soft start capacitor Css. In this way, the soft start capacitor Css is charged such that the soft start voltage Vss matches the voltage obtained by adding the feedback voltage Vfb and the offset voltage Voffset.

By contrast, in a state where the soft start voltage Vss is higher than the reference voltage Vref, the amplifier 35 generates the switch signal S3 corresponding to a difference between a voltage input to the non-inverting input terminal (+) (=voltage obtained by adding the feedback voltage Vfb and the offset voltage Voffset) and a voltage input to the inverting input terminal (−) (=reference voltage Vref). A differential current obtained by subtracting the current flowing through the fourth transistor 33 from the current which is output from the third current source 38 according to the switch signal S3 flows through the soft start capacitor Css. In this way, the soft start capacitor Css is charged such that the reference voltage Vref matches the voltage obtained by adding the feedback voltage Vfb and the offset voltage Voffset.

Figure 6:
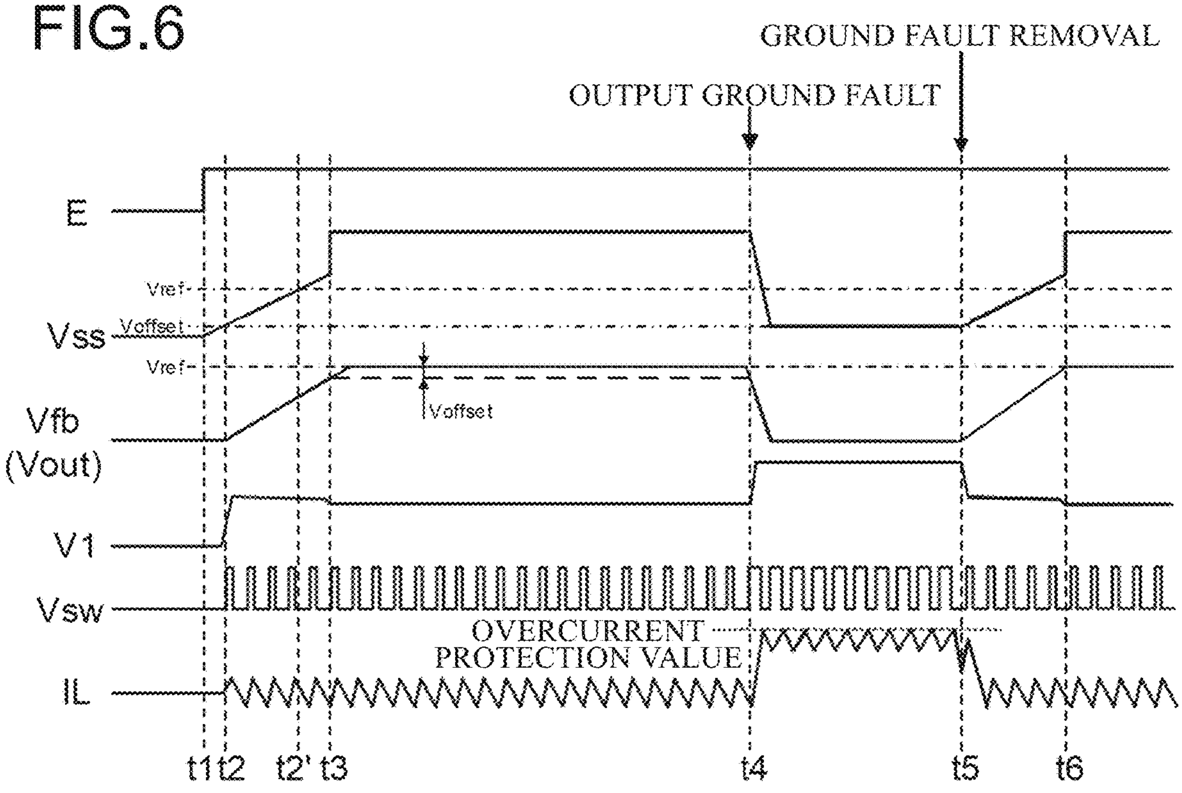
FIG. 6 is a timing chart showing signals and an output current in the power supply device in the present disclosure.

FIG. 6 is a timing chart showing signals and an output current IL in the power supply device X in the present disclosure. In FIG. 6, the enable signal E, the soft start voltage Vss, the feedback voltage Vfb, the error signal V1, the switch voltage Vsw and the output current IL are shown sequentially from above.

As shown in FIG. 6, when power is turned on at predetermined timing t1, the enable signal E rises high. Then, the soft start voltage Vss and the feedback voltage Vfb gradually increase at a constant rate of increase from the timing t1 to timing t3. Changes in values from the timing t1 to the timing t3 will be sequentially described.

When a predetermined time elapses from the timing t1, and timing t2 arrives, the magnitude of the soft start voltage Vss reaches the offset voltage Voffset. Between the timing t1 and the timing t2, the feedback voltage Vfb is kept falling. When a predetermined time elapses from the timing t2, and timing t2' arrives, the magnitude of the soft start voltage Vss matches the reference voltage Vref. Between the timing t2 and the timing t2', the feedback voltage Vfb is subjected to feedback control with the soft start voltage Vss used as a target value, and the feedback voltage Vfb increases at a constant rate of increase so as to follow the soft start voltage Vss.

Here, with attention focused on the operation of the soft start control circuit 28, a more detailed description will be given as follows. Between the timing t1 and the timing t2', the amplifier 35 generates the switch signal S3 corresponding to a difference between a voltage obtained by adding the feedback voltage Vfb and the offset voltage Voffset and the soft start voltage Vss. After the timing t2', the amplifier 35 generates the switch signal S3 corresponding to a difference between the voltage obtained by adding the feedback voltage Vfb and the offset voltage Voffset and the reference voltage Vref.

Immediately before the timing t3 from the timing t1, the fourth transistor 33 is turned on by receiving the switch signal S3. Hence, a current output from the third current source 38 is passed between the source and drain of the fourth transistor 33 while flowing into the soft start capacitor Css, and then flows to a ground end. In the meantime, the soft start capacitor Css is relatively gradually charged by a differential current obtained by subtracting a current flowing through the fourth transistor 33 from the current output from the third current source 38 (that is, the amount of charge of the soft start capacitor Css gradually increases), with the result that the soft start voltage Vss gradually increases. The feedback voltage Vfb is subjected to feedback control according to an increase in the soft start voltage Vss, and thus the feedback voltage Vfb increases.

When a predetermined time elapses from the timing t2', and the timing t3 arrives, the magnitude of the feedback voltage Vfb matches a voltage obtained by subtracting the offset voltage Voffset from the reference voltage Vref. In other words, at the timing t3, the inverting input terminal (−) and the non-inverting input terminal (+) of the amplifier 35 have the same potential. Then, when after the timing t3, the feedback voltage Vfb further increases, the non-inverting input terminal (+) of the amplifier 35 is higher in potential than the inverting input terminal (−). Consequently, the switch signal S3 is turned high.

The fourth transistor 33 is brought into a fully off state by receiving the switch signal S3. Hence, a discharge path via the fourth transistor 33 is blocked. Consequently, until the timing t4 to be described later after the timing t3, the soft start voltage Vss is fixed to a high level. The feedback voltage Vfb increases until matching the reference voltage Vref after the timing t3, and the feedback voltage Vfb is fixed until the timing t4.

Here, if the output end of the switch output stage 12 is brought into the ground fault state (state where the output end is connected to the ground end) at predetermined timing t4 after the timing t3, the output voltage Vout (=the feedback voltage Vfb) decreases to the zero value (=ground level).

As the feedback voltage Vfb decreases, a difference increases between a voltage input to the non-inverting input terminal (+) of the amplifier 35 (=voltage obtained by adding the feedback voltage Vfb and the offset voltage Voffset) and a voltage input to the inverting input terminal (−) of the amplifier 35 (=reference voltage Vref). Hence, the switch signal S3 decreases. The fourth transistor 33 is turned on again by receiving the switch signal S3 here, and thus the amount of charge (=charge amount) of the soft start capacitor Css decreases. In this way, the soft start voltage Vss also decreases together with the feedback voltage Vfb. The soft start voltage Vss decreases below the reference voltage Vref, and decreases until the soft start voltage Vss matches the offset voltage Voffset.

As the feedback voltage Vfb decreases, the error signal V1 increases, and the on-duty cycle of the switch output stage 12 increases. The ground fault state is entered, and thus the output current IL rapidly increases. When the output current IL reaches the predetermined overcurrent protection value, the overcurrent protection function of the protection circuit 17 is operated. In this way, the error signal V1 is fixed to a predetermined value, and thus an increase in the output current IL is restricted.

As described above, the feedback voltage Vfb is subjected to feedback control with the lower one of the soft start voltage Vss and the reference voltage Vref used as the target value. Hence, when in a state where after the timing t4, the soft start voltage Vss is previously decreased to a voltage value lower than the reference voltage Vref, the ground fault state is removed at the predetermined timing t5, the error signal V1 decreases without delay, with the result that the on-duty cycle of the switch output stage 12 decreases. Then, after the timing t5, the feedback voltage Vfb is subjected to feedback control with the soft start voltage Vss (=offset voltage Voffset) used as the target value. Hence, from the timing t5 to timing t6, as in the soft start operation at startup, the feedback voltage Vfb is subjected to feedback control so as to gradually increase. In this way, a rapid increase (=occurrence of an overshoot) in the output voltage Vout (=feedback voltage Vfb) is suppressed, and thus it is possible to suppress the occurrence of an inrush current.

<Considerations for Soft Start Function>

Incidentally, in the power supply device (the power supply device X or Y described above) having the soft start function described above, there is room for further consideration on the following problem. In an output capacitor used in the power supply device as described above (the output capacitor Cout in FIG. 1), the upper limit of the capacitance value of the capacitor is set according to an output voltage. This is because when as the output capacitor, an output capacitor with a relatively large capacitance is used, a startup failure may occur.

Figure 7:
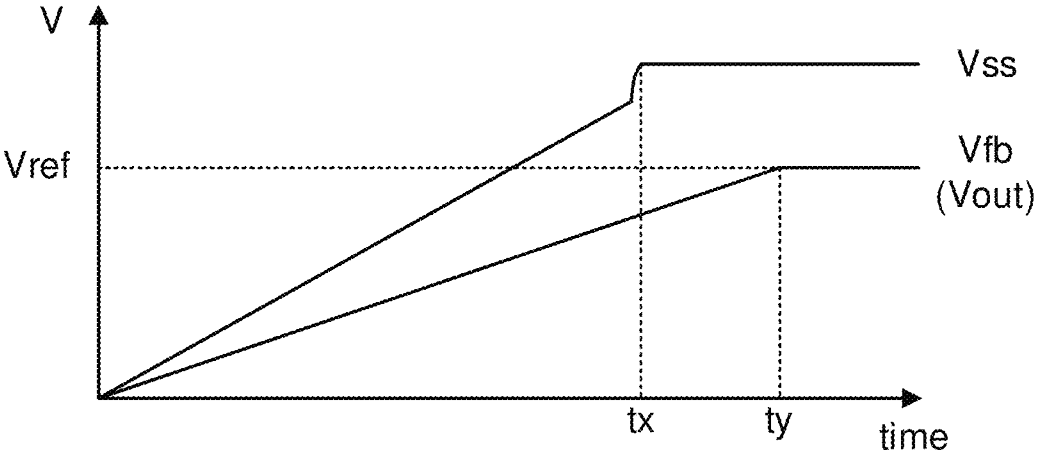
FIG. 7 is a graph showing changes in a soft start voltage and a feedback voltage at startup when an output capacitor (output capacitor in FIG. 1) with a relatively large capacitance is used.

A more detailed description will be given as follows. FIG. 7 is a graph showing changes in a soft start voltage Vss and a feedback voltage Vfb at startup when an output capacitor (the output capacitor Cout in FIG. 1) with a relatively large capacitance is used.

In FIG. 7, when a value in a horizontal axis is a zero value, the power supply device is started up. As shown in FIG. 7, the soft start voltage Vss and the feedback voltage Vfb (=output voltage Vout) increase with time. However, since the capacitance of the output capacitor is relatively large, the rate of increase of the feedback voltage Vfb is lower than the rate of increase of the soft start voltage Vss. Hence, a difference between the feedback voltage Vfb and the soft start voltage Vss increases with time. Then, at predetermined timing tx before timing ty at which the feedback voltage Vfb reaches the reference voltage Vref arrives, the soft start voltage Vss is fixed to a high level, and thus an overcurrent protection operation is performed, with the result that a startup failure may occur.

Hence, in the power supply device having the soft start function as described above, it is difficult to adopt, as the output capacitor, an electrolytic capacitor or the like which is relatively inexpensive and has a large capacitance, and this may lead to an increase in cost.

Hence, the following configuration is considered. Specifically, the configuration is considered in which in the soft start generation circuit 18 described above, an increase in the soft start voltage Vss can be temporarily stopped. In this case, the soft start generation circuit 18 can temporarily stop an increase in the soft start voltage Vss according to various parameters (such as the voltage levels of the signals, the output current and the output voltage) in the power supply device (for example, the power supply device X or Y described above).

Figure 8:
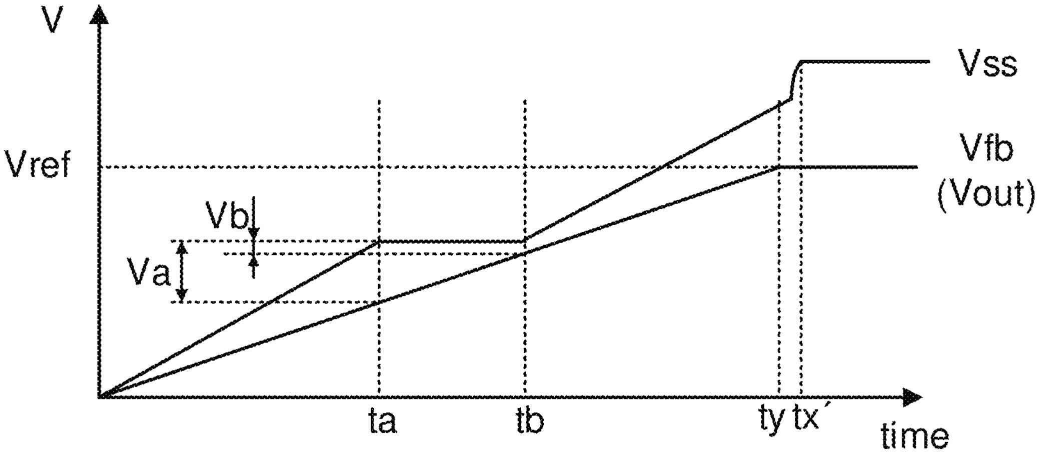
FIG. 8 is a graph showing an example of changes in the soft start voltage and the feedback voltage when a soft start generation circuit temporarily stops an increase in a soft start voltage.

FIG. 8 is a graph showing an example of changes in the soft start voltage Vss and the feedback voltage Vfb when the soft start generation circuit 18 temporarily stops an increase in the soft start voltage Vss.

For example, the soft start generation circuit 18 as described above can temporarily stop an increase in the soft start voltage Vss according to a difference between the soft start voltage Vss and the feedback voltage Vfb. More specifically, as shown in FIG. 8, when the soft start voltage Vss and the feedback voltage Vfb increase from startup, predetermined timing ta arrives and thus a differential voltage between the soft start voltage Vss and the feedback voltage Vfb reaches a predetermined voltage Va (=voltage difference which does not cause the overcurrent protection circuit HOCP to perform the overcurrent protection operation), an increase in the soft start voltage Vss is temporarily stopped. On the other hand, the feedback voltage Vfb continues to increase so as to match the soft start voltage Vss after the timing ta. Hence, after the timing ta, the differential voltage between the soft start voltage Vss and the feedback voltage Vfb decreases. Thereafter, when predetermined timing tb arrives, and thus a difference between the soft start voltage Vss and the feedback voltage Vfb reaches a predetermined voltage Vb, an increase in the soft start voltage Vss is restarted.

In this way, even if at the startup of the power supply device (for example, the power supply device X or Y described above), a difference between the soft start voltage Vss and the feedback voltage Vfb increases with time, when the difference is larger than the predetermined voltage Va, an increase in the soft start voltage Vss is temporarily stopped. Hence, at timing tx' after the timing ty at which the feedback voltage Vfb reaches the reference voltage Vref arrives, the soft start voltage Vss is fixed to a high level. Therefore, the overcurrent protection operation as described above is suppressed, and thus the occurrence of a startup failure in the power supply device can be suppressed. Consequently, even when an electrolytic capacitor or the like which is relatively inexpensive and has a large capacitance is adopted as the output capacitor, a startup failure is unlikely to occur in the power supply device, with the result that it is possible to suppress an increase in cost.

As the soft start generation circuit 18 as described above, a configuration in which an increase in the soft start voltage Vss is temporarily stopped according to the result of the detection performed by the overcurrent protection circuit HOCP can be adopted.

Figure 9:
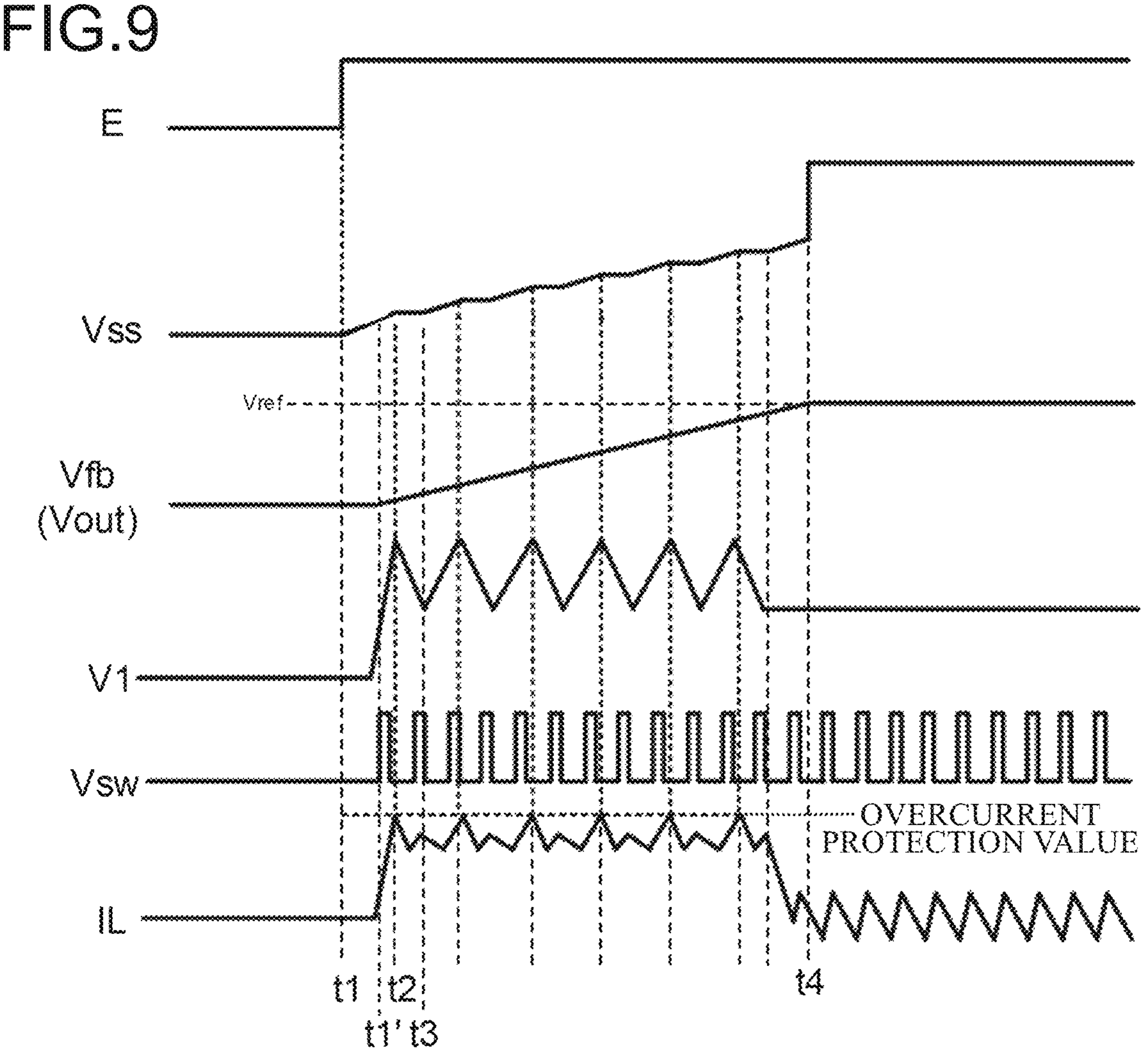
FIG. 9 is a timing chart at startup when a configuration in which an increase in the soft start voltage is temporarily stopped according to the result of detection performed by an overcurrent protection circuit is adopted as the soft start generation circuit.

FIG. 9 is a timing chart at startup when the configuration in which an increase in the soft start voltage Vss is temporarily stopped according to the result of the detection performed by the overcurrent protection circuit HOCP is adopted as the soft start generation circuit 18. In FIG. 9, the enable signal E, the soft start voltage Vss, the feedback voltage Vfb, the error signal V1, the switch voltage Vsw and the output current IL are shown sequentially from above.

As shown in FIG. 9, when power is turned on at predetermined timing t1, the enable signal E rises high. Then, the soft start voltage Vss gradually increases at a constant rate of increase from the timing t1 to timing t2. Then, the feedback voltage Vfb gradually increases at a constant rate of increase from timing t1' to the timing t2. Immediately before the timing t1, the error signal V1 increases, the switch voltage Vsw corresponding to the error signal V1 is generated and thus the output current IL increases.

From the timing t1' to the timing t2, the rate of increase of the soft start voltage Vss is higher than the rate of increase of the feedback voltage Vfb. Hence, a difference between the soft start voltage Vss and the feedback voltage Vfb increases with time. Consequently, an output duty cycle increases, and thus the output current IL increases. Then, when the predetermined timing t2 arrives, the output current IL reaches the predetermined overcurrent protection value. Then, the overcurrent protection circuit HOCP detects the overcurrent state, and thus the output current IL is restricted. Here, the output control circuit 21 drives and controls the switch output stage 12 such that the switch output stage 12 performs hiccup drive.

When the overcurrent protection circuit HOCP detects the overcurrent state at the timing t2, the soft start generation circuit 18 stops an increase in the soft start voltage Vss. The error signal V1 decreases with time from the timing t2.

When a predetermined time elapses from the timing t2, the timing t3 arrives and a pulse is generated in the reference clock signal S1 at a predetermined switching frequency, automatic return of the output current IL is attempted. Accordingly, the soft start generation circuit 18 increases the soft start voltage Vss again at the constant rate of increase.

Until timing t5 at which the feedback voltage Vfb matches the reference voltage Vref arrives after the timing t3, the soft start generation circuit 18 controls an increase in the soft start voltage Vss according to the result of the detection performed by the overcurrent protection circuit HOCP as with the control from the timing t1' to the timing t3.

<Example of Soft Start Generation Circuit>

Figure 10:
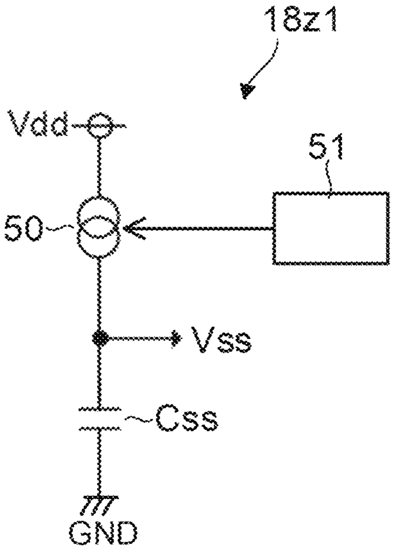
FIG. 10 is a block diagram showing an example of the soft start generation circuit in the present embodiment.

As the soft start generation circuit 18 as described above, for example, a configuration (here, a "soft start generation circuit 18*z*1") as shown in FIG. 10 can be adopted.

The soft start generation circuit 18*z*1 includes a current source 50, a current circuit 51 and the soft start capacitor Css. The current source 50 in an on-state supplies a current to the soft start capacitor Css to charge the soft start capacitor Css. When the current source 50 is brought into an off-state, the charge of the soft start capacitor Css is stopped.

The current circuit 51 can switch the on/off states of the current source 50 at predetermined timing. Specifically, the predetermined timing described above may be the timing at which the differential voltage between the soft start voltage Vss and the feedback voltage Vfb reaches the predetermined voltage Va as described above. In this case, the current circuit 51 brings the current source 50 into the on-state at timing at which the enable signal E rises high. Then, when the differential voltage between the soft start voltage Vss and the feedback voltage Vfb reaches the predetermined voltage Va, the current circuit 51 switches the current source 50 to the off-state. Then, when the differential voltage decreases to the predetermined voltage Vb, the current circuit 51 switches the current source 50 to the on-state again.

For example, the predetermined timing described above may be timing at which the overcurrent protection circuit HOCP detects the overcurrent state. In this case, the current circuit 51 brings the current source 50 into the on-state at timing at which the enable signal E rises high. Then, when the overcurrent protection circuit HOCP detects the overcurrent state, the current circuit 51 switches the current source 50 to the off-state. Then, when a predetermined time elapses or when the overcurrent state is not detected (the overcurrent state is removed), the current circuit 51 switches the current source 50 to the on-state again.

<Another Example of Soft Start Generation Circuit>

Figure 11:
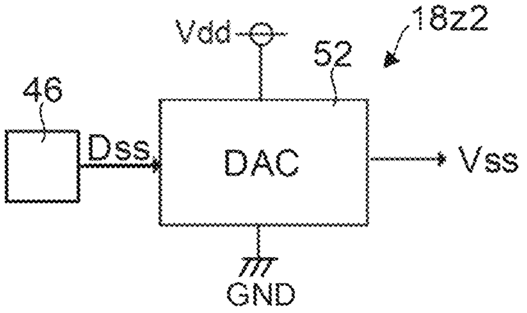
FIG. 11 is a block diagram showing another example of the soft start generation circuit in the present embodiment.

When as the soft start generation circuit 18 as described above, a configuration using a DAC (Digital Analog Converter) is adopted, a configuration as shown in FIG. 11 can be adopted. Here, the configuration is referred to as a soft start generation circuit 18*z*2.

The soft start generation circuit 18*z*2 includes a digital signal generation circuit 46 and a DAC 52. For example, the DAC 52 receives, from the digital signal generation circuit 46, a digital signal Dss which is incremented with time to generate the soft start voltage Vss of an analog signal.

The DAC 52 forcibly stops an operation of generating the soft start voltage Vss at predetermined timing, and restarts the operation of generating the soft start voltage Vss at a predetermined switching cycle after the stopping. When the operation of generating the soft start voltage Vss is stopped, the digital signal generation circuit 46 stops the incrementing of the digital signal Dss. When the operation of generating the soft start voltage Vss is restarted, the digital signal generation circuit 46 restarts the incrementing of the digital signal Dss.

Specifically, the predetermined timing described above is as follows. As described above, at the timing at which the differential voltage between the soft start voltage Vss and the feedback voltage Vfb reaches the predetermined voltage Va, the operation of generating the soft start voltage Vss is forcibly stopped, and when the differential voltage decreases to the predetermined voltage Vb, the operation of generating the soft start voltage Vss is restarted.

The predetermined timing described above may be set as follows. At the timing at which the overcurrent protection circuit HOCP detects the overcurrent state, the operation of generating the soft start voltage Vss is stopped, and when a predetermined time elapses or when the overcurrent state is not detected (the overcurrent state is removed), the operation of generating the soft start voltage Vss is restated.

As the soft start generation circuit 18 included in the semiconductor device 100*x* or 100*y* described above, the soft start generation circuit 18*z*1 or the soft start generation circuit 18*z*2 can be adopted.

Figure 12:
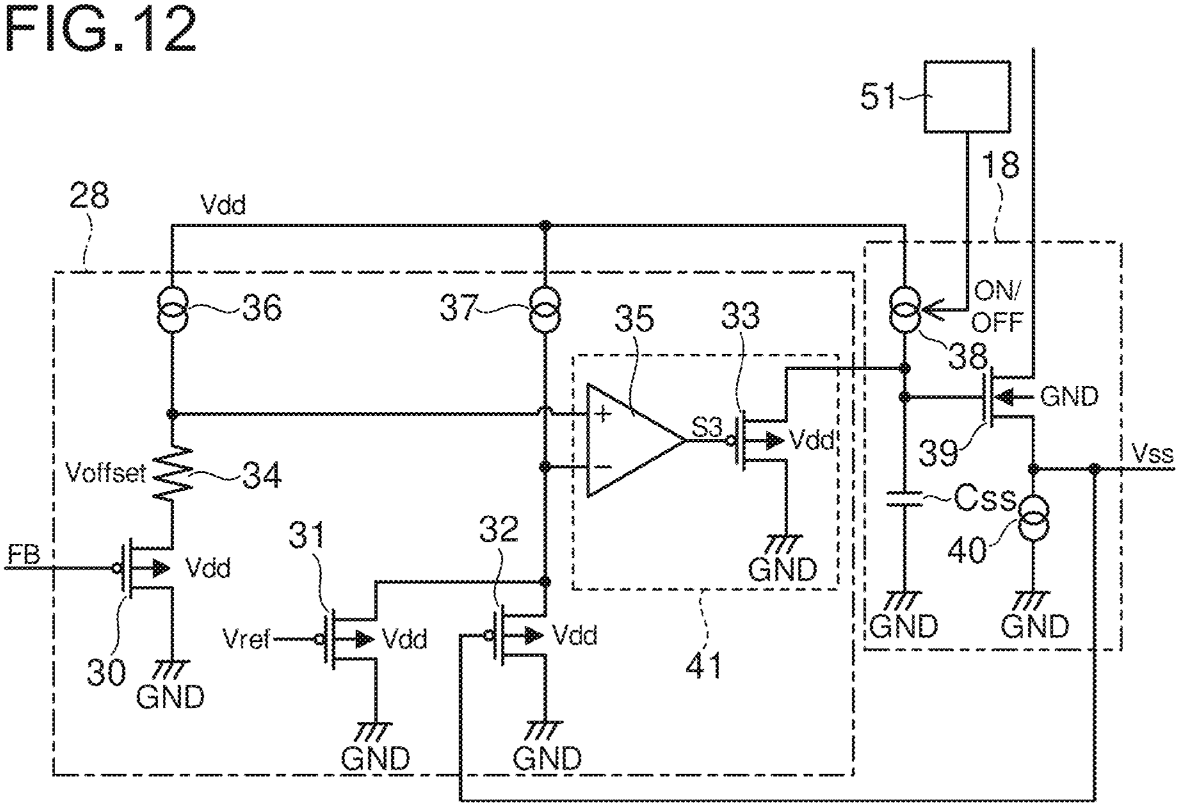
FIG. 12 is a block diagram showing, when the soft start generation circuit is adopted in the semiconductor device described above, the configuration of the soft start generation circuit.

FIG. 12 is a block diagram showing, when the soft start generation circuit 18*z*1 is adopted in the semiconductor device 100*x* described above, the configuration of the soft start generation circuit 18*z*1. As shown in FIG. 12, when the soft start generation circuit 18*z*1 is adopted in the semiconductor device 100*x* described above, the current circuit 51 can switch the on/off states of the current source 50 at the predetermined timing described above.

The present disclosure is not limited to the embodiment described above, and various changes can be made without departing from the spirit of the present disclosure. For example, although the soft start generation circuit 18 temporarily stops an increase in the soft start voltage Vss, and thereafter when a difference between the soft start voltage Vss and the feedback voltage Vfb reaches the predetermined value, the soft start generation circuit 18 restarts an increase in the soft start voltage Vss, the present disclosure is not limited to this configuration. For example, after an increase in the soft start voltage Vss is temporarily stopped, an increase in the soft start voltage Vss may be restarted when a predetermined time elapses.

Additional Notes

A power supply control circuit (15*x*) disclosed in the specification includes: a soft start generation circuit (18) that outputs a soft start voltage (Vss) which gradually increases with time; an error signal generation circuit (20) that generates an error signal (V1) corresponding to a difference between a feedback voltage (Vfb) corresponding to an output voltage (Vout) in a switch output stage (12) and the soft start voltage (Vss); an output control circuit (21) that controls the switch output stage (12) according to the error signal (V1); and a soft start control circuit (28) that controls the soft start voltage (Vss) according to the feedback voltage (Vfb) (first configuration).

Preferably, in the power supply control circuit (15*x*) of the first configuration, the error signal generation circuit (20) generates the error signal (V1) according to a difference between the lower one of a predetermined reference voltage (Vref) and the soft start voltage (Vss) and the feedback voltage (Vfb) (second configuration).

Preferably, in the power supply control circuit (15*x*) of the second configuration, the soft start generation circuit (18) includes a capacitor (Css) that outputs the soft start voltage (Vss) corresponding to the amount of charge, and the soft start control circuit (28) includes a charge/discharge control circuit (41) that charges and discharges the capacitor (Css) according to the difference between the lower one of the reference voltage (Vref) and the soft start voltage (Vss) and the feedback voltage (Vfb) (third configuration).

Preferably, in the power supply control circuit (15*x*) of the third configuration, the charge/discharge control circuit (41) charges and discharges the capacitor (Css) in a state where the soft start voltage (Vss) is lower than the reference voltage (Vref) such that the feedback voltage (Vfb) matches the soft start voltage (Vss), and charges and discharges the capacitor (Css) in a state where the soft start voltage (Vss) is higher than the reference voltage (Vref) such that the feedback voltage (Vfb) matches the reference voltage (Vref) (fourth configuration).

Preferably, in the power supply control circuit (15*x*) of the first configuration, the output control circuit (21) controls the on-duty cycle of the switch output stage (12) according to the error signal (V1) (fifth configuration).

Preferably, the power supply device (X) disclosed in the specification includes: the power supply control circuit (15*x*) described in any one of the first to fifth configurations; and the switch output stage (12), and the power supply device (X) generates the output voltage (Vout) from an input voltage (Vin) (sixth configuration).

Preferably, in the power supply control circuit (15*x*, 15*y*) disclosed in the specification and including: a soft start generation circuit (18) that outputs a soft start voltage (Vss) which gradually increases with time; an error signal generation circuit (20) that generates an error signal (V1) corresponding to a difference between a feedback voltage (Vfb) corresponding to an output voltage (Vout) in a switch output stage (12) and the soft start voltage (Vss); and an output control circuit (21) that controls the switch output stage (12) according to the error signal (V1), the soft start generation circuit (18) can temporarily stop an increase in the soft start voltage (Vss) (seventh configuration).

Preferably, in the power supply control circuit (15*x*, 15*y*) of the seventh configuration, the soft start generation circuit (18) can temporarily stop an increase in the soft start voltage (Vss) according to a difference between the soft start voltage (Vss) and the feedback voltage (Vfb) (eighth configuration).

Preferably, the power supply control circuit (15*x*, 15*y*) of the seventh configuration includes an overcurrent protection circuit (HOCP) which can detect whether an output current (IL) output by the switch output stage (12) is equal to or greater than a predetermined overcurrent protection value, and the soft start generation circuit (18) can temporarily stop an increase in the soft start voltage (Vss) according to the result of the detection performed by the overcurrent protection circuit (HOCP) (ninth configuration).

Preferably, in the power supply control circuit (15*x*, 15*y*) of the seventh configuration, the output control circuit (21) forcibly stops an operation of generating the output current (IL) according to the result of the detection performed by the overcurrent protection circuit (HOCP), and thereafter restarts the operation of generating the output current (IL) at a predetermined switching cycle (tenth configuration).

Preferably, in the power supply control circuit (15*x*, 15*y*) of the seventh configuration, the soft start generation circuit (18) includes: a capacitor (Css) which outputs the soft start voltage (Vss) corresponding to the amount of charge; a current source (38) which can charge the capacitor (Css); and a current circuit (aa) which can perform on/off control on the current source (38) so as to stop the charge or discharge of the capacitor (Css), and the charge of the capacitor (Css) is stopped such that an increase in the soft start voltage (Vss) is stopped (eleventh configuration).

Preferably, the power supply control circuit (15*x*, 15*y*) of the seventh configuration includes a soft start control circuit (28) which controls the soft start voltage (Vss) according to a difference between the lower one of a predetermined reference voltage (Vref) and the soft start voltage (Vss) and the feedback voltage (Vfb) (twelfth configuration).

Preferably, in the power supply control circuit (15*x*, 15*y*) of the twelfth configuration, the soft start generation circuit (18) includes the capacitor (Css) which outputs the soft start voltage (Vss) corresponding to the amount of charge, and the soft start control circuit (28) includes a charge/discharge control circuit (41) which charges and discharges the capacitor (Css) according to a difference between the lower one of the reference voltage (Vref) and the soft start voltage (Vss) and the feedback voltage (Vfb) (thirteenth configuration).

Preferably, in the power supply control circuit (15*x*, 15*y*) of the thirteenth configuration, the charge/discharge control circuit (41) charges and discharges the capacitor (Css) in a state where the soft start voltage (Vss) is lower than the reference voltage (Vref) such that the feedback voltage (Vfb) matches the soft start voltage (Vss), and charges and discharges the capacitor (Css) in a state where the soft start voltage (Vss) is higher than the reference voltage (Vref) such that the feedback voltage (Vfb) matches the reference voltage (Vref) (fourteenth configuration).

Preferably, the power supply device disclosed in the specification includes: the power supply control circuit (15*x*, 15*y*) described in any one of the seventh to fourteenth configurations; and the switch output stage (12), and the power supply device generates the output voltage (Vout) corresponding to the error signal (V1) from an input voltage (Vin) (fifteenth configuration).

In the power supply control circuit (15*x*) of the first configuration, the soft start voltage (Vss) can be controlled according to variations in the feedback voltage (Vfb) which are caused after the output end of the output voltage (Vout) is brought into a ground fault state until the ground fault state is removed. Hence, an overshoot in which the output voltage (Vout) rapidly increases immediately after the ground fault state is removed is suppressed, and thus the occurrence of an inrush current can be suppressed.

In the power supply control circuit (15*x*) of the second configuration, the soft start control circuit (28) can more preferably control the soft start voltage (Vss).

In the power supply control circuit (15*x*) of the third configuration, the soft start voltage (Vss) can be varied by the charge and discharge of the capacitor (Css). In this way, the soft start control circuit (28) can more preferably control the soft start voltage (Vss).

In the power supply control circuit (15*x*) of the fourth configuration, the charge and discharge of the capacitor (Css) can be more preferably controlled.

In the power supply control circuit (15*x*) of the fifth configuration, the output voltage (Vout) can be controlled by the control of the on-duty cycle of the switch output stage (12). In this way, the output voltage (Vout) can be preferably controlled.

In the power supply device of the sixth configuration described in the specification, it is possible to provide the power supply device that suppresses the overshoot in which the output voltage (Vout) rapidly increases immediately after the ground fault state is removed to be able to suppress the occurrence of an inrush current.

In the power supply control circuit (15*x*, 15*y*) of the seventh configuration, an increase in the soft start voltage (Vss) can be temporarily stopped before a difference between the soft start voltage (Vss) and the feedback voltage (Vfb) relatively increases.

In the power supply control circuit (15*x*, 15*y*) of the eighth configuration, when a difference between the soft start voltage (Vss) and the feedback voltage (Vfb) relatively increases, it is possible to temporarily stop or restart an increase in the soft start voltage (Vss) at desired timing.

In the power supply control circuit (15*x*, 15*y*) of the ninth configuration, when the output current (IL) is brought into the overcurrent state, it is possible to temporarily stop an increase in the soft start voltage (Vss). It is possible to preferably suppress the problem in which a difference between the soft start voltage (Vss) and the feedback voltage (Vfb) relatively increases.

In the power supply control circuit (15*x*, 15*y*) of the tenth configuration, it is possible to more preferably control an increase in the soft start voltage (Vss).

In the power supply control circuit (15*x*, 15*y*) of the eleventh configuration, an increase in the soft start voltage (Vss) can be controlled by the charge and discharge of the capacitor (Css). Hence, it is possible to more preferably control an increase in the soft start voltage (Vss).

In the power supply control circuit (15*x*, 15*y*) of the twelfth configuration, while suppressing the problem in which a difference between the soft start voltage (Vss) and the feedback voltage (Vfb) relatively increases, it is possible to suppress the occurrence of an inrush current immediately after the ground fault state is removed.

In the power supply control circuit (15*x*, 15*y*) of the thirteenth configuration, the soft start voltage (Vss) can be varied by the charge and discharge of the capacitor (Css). In this way, the soft start control circuit (28) can more preferably control the soft start voltage (Vss).

In the power supply control circuit (15*x*, 15*y*) of the fourteenth configuration, the charge and discharge of the capacitor (Css) can be more preferably controlled.

In the power supply device of the fifteenth configuration described in the specification, it is possible to provide the power supply device that can suppress the occurrence of an inrush current immediately after the ground fault state is removed while suppressing the problem in which a difference between the soft start voltage (Vss) and the feedback voltage (Vfb) relatively increases.

What is claimed is:

1. A power supply control circuit comprising:
a soft start generation circuit that outputs a soft start voltage which gradually increases with time;
an error signal generation circuit that generates an error signal corresponding to a difference between a feedback voltage corresponding to an output voltage in a switch output stage and the soft start voltage;
an output control circuit that controls the switch output stage according to the error signal; and
a soft start control circuit that controls the soft start voltage according to the feedback voltage,
wherein the soft start generation circuit includes
a capacitor,
a current source that outputs a current, and
a first transistor having a gate thereof connected to the capacitor and a source thereof connected to the current source, the first transistor being configured to receive a current from the current source and output the soft start voltage corresponding to a charge amount of the capacitor, and
the soft start control circuit includes a charge/discharge control circuit configured to control a current flowing into the capacitor according to a difference between a) a lesser of a predetermined reference voltage and the soft start voltage and b) a first voltage based on the feedback voltage, thereby controlling the soft start voltage.

2. The power supply control circuit according to claim 1, wherein the error signal generation circuit generates the error signal according to a difference between a) the lesser of the predetermined reference voltage and the soft start voltage and b) the feedback voltage.

3. The power supply control circuit according to claim 1, wherein the charge/discharge control circuit
charges and discharges the capacitor in a state where the soft start voltage is lower than the reference voltage such that the feedback voltage matches the soft start voltage, and
charges and discharges the capacitor in a state where the soft start voltage is higher than the reference voltage such that the feedback voltage matches the reference voltage.

4. The power supply control circuit according to claim 1, wherein the output control circuit controls an on-duty cycle of the switch output stage according to the error signal.

5. A power supply device comprising:
the power supply control circuit according to claim 1; and
the switch output stage,
wherein the power supply device generates the output voltage from an input voltage.

6. The power supply control circuit according to claim 1, wherein
the charge/discharge control circuit includes:
an amplifier that generates a control signal corresponding to a difference between a lower one of the reference voltage and the soft start voltage and the first voltage; and
a second transistor that is connected to the amplifier and the capacitor, and on/off controlled based on the control signal, and the capacitor is charged and discharged by a current corresponding to an on/off state of the second transistor.

* * * * *